United States Patent [19]

Mitsuya et al.

[11] 4,424,974

[45] Jan. 10, 1984

[54] FERRO FLUIDIC SEAL

[75] Inventors: Yasunaga Mitsuya, Sekimachi; Kunio Hoshiya, Higashi-Yamato; Shigemitsu Oguchi, Tokorozawa; Reizo Kaneko, Higashi-Yamato, all of Japan

[73] Assignee: Nippon Telegraph & Telephone Public Corp., Tokyo, Japan

[21] Appl. No.: 402,598

[22] Filed: Jul. 28, 1982

[30] Foreign Application Priority Data

| Aug. 8, 1981 | [JP] | Japan | 56-124613 |
| Aug. 8, 1981 | [JP] | Japan | 56-124614 |
| Nov. 24, 1981 | [JP] | Japan | 56-188068 |
| Jan. 19, 1982 | [JP] | Japan | 57-6378 |
| Jan. 19, 1982 | [JP] | Japan | 57-6380 |

[51] Int. Cl.³ .................. F16J 15/16; F16J 15/40
[52] U.S. Cl. ........................... 277/80; 277/135
[58] Field of Search .............. 277/80, 1, 135, DIG. 7

[56] References Cited

U.S. PATENT DOCUMENTS

| 3,740,060 | 6/1973 | Miskolczy et al. | 277/80 |
| 3,834,775 | 9/1974 | Tuffias | 277/80 |
| 4,252,353 | 2/1981 | Raj et al. | 277/80 |
| 4,357,022 | 11/1982 | Raj | 277/80 |

*Primary Examiner*—Robert I. Smith
*Attorney, Agent, or Firm*—Armstrong, Nikaido, Marmelstein & Kubovcik

[57] ABSTRACT

An improved ferro fluidic seal assembly having a cylindrical permanent magnet, a pair of ring-shaped yokes coupled coaxially with said magnet, and a fresh fluid storage containing ferro magnetic fluid mounted in a room defined by said magnet and yokes. Said fresh fluid storage is composed of a resilient elongated member like a stainless steel belt adapted and fixed in a circular shape along the surface of the magnet, and supplies fresh fluid to the clearance gaps defined between said yokes and a rotational body to seal said clearance gaps.

20 Claims, 22 Drawing Figures

FERRO FLUIDIC SEAL

BACKGROUND OF THE INVENTION

The present invention relates to a ferro fluidic seal, or a magnetic fluidic seal. The present seal is used as a dust seal, a vacuum seal, or a seal for a nuclear application apparatus for confining radioactivity. With the use of a ferro fluidic seal, a high density magnetic disc memory with a flying head which flies 0.22–0.27 μm height may be implemented.

A ferro fluid is a liquid having ferro-magnetic property, and said ferro fluid is composed of carrier fluid, magnetic particles in that fluid, and stabilizer or interface activator which holds magnetic particles in a colloidal status. Since magnetic particles are in colloidal status, those particles are distributed uniformly in fluid, but do not couple with one another.

A ferro fluidic seal is used in a magnetic flux, and the sealing capability (allowable pressure) is proportional to the product of the magnetic flux and the magnetic field in the fluid. A ferro fluidic seal has the advantages that a complete seal is accomplished with small friction, a complete seal with no leak is obtained, and the manufacturing accuracy of a spindle and/or a bearing needs not be so severe.

Since ferro fluid is worn or exhausted in a long run due to evaporation et al of the fluid, fresh fluid must be supplied. Fresh fluid may be supplied either from an external member outside of a seal, or an inner member within a seal. Usually, an inner supply means is used because of the simplicity of the structure of a seal.

FIG. 1 shows the structure of a fragmentary perspective view of a prior ferro fluidic seal which seals a spindle passing through a housing. In FIG. 1, the reference numeral 1 is a housing, through which the spindle 2 passes. The seal comprising a pair of ferro-magnetic yoke rings 4a and 4b, a permanent magnet 3 positioned between said yokes, and a fresh fluid storage 6 which contains ferro fluid, is positioned between the spindle 2 and the housing 1. The seal is fixed to the housing 1 by using adhesive means or O-ring seal. In the above structure, a magnetic flux passes from the magnet 3, through the yoke 4a, the spindle 2, and the yoke 4b, to the magnet 3, and the ferro fluid 5 in the gap between the spindle 2 and the yokes 4a, 4b provides the complete seal.

Fresh fluid is supplied from the fresh fluid storage 6 to said gap, as the fluid is exhausted. In a prior art, said fresh fluid storage 6 is a porous sintered metal, porous plastics, or felt. The U.S. Pat. No. 3,740,060 discloses a shaft seal with porous fluid reservoir.

However, a porous metal has the disadvantages that the manufacturing process of that metal is complicated, and as the metal must be fixed to the yokes 4a and 4b through adhesive means, the assembling process is complicated as well. A porous plastics has the disadvantages that the accurate manufacturing is difficult, and if the accuracy is not sufficient, the trouble that the fresh fluid storage 6 might contact with the spindle 2 occurs. Further, a felt for use as a fresh fluid storage has the disadvantages that accurate manufacturing is complicated, and a fiber separated from the felt body stains a spindle and/or a bearing.

SUMMARY OF THE INVENTION

It is an object, therefore, of the present invention to overcome the disadvantages and limitations of a prior ferro fluidic seal.

It is also an object of the present invention to provide a new and improved ferro fluidic seal which has a fresh fluid storage with a simple and accurate structure.

The fundamental concept of the present invention is the use of a resilient elongated member as a fresh fluid storage. According to the present invention, a ferro fluidic seal is composed of a seal assembly having a substantially cylindrical permanent magnet magnetized in the axial direction, a pair of ring shaped yokes made of ferro-magnetic material coupled coaxially with said permanent magnet, and a fresh fluid storage containing ferro magnetic fluid mounted in a room defined by said magnet and the yokes; a rotational body rotational relative to said seal assembly, said rotational body being arranged coaxially with said seal assembly so that the gaps are provided between the rotational body and the yokes, and said rotational body being made of ferro-magnetic material; fluid contained in said fresh fluid storage going to said gaps between the yokes and the rotational body to seal said gaps; said fresh fluid storage having a resilient elongated member adapted in a circular shape along the surface of said cylindrical permanent magnet, and said member is fixed on the surface of the permanent magnet with a spring action by the member itself.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
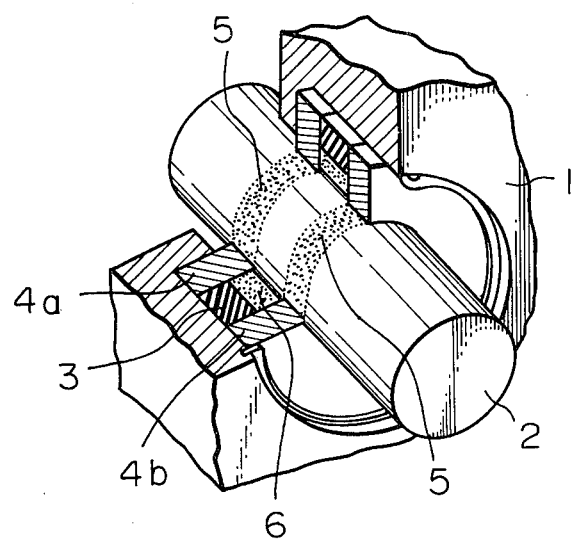
FIG. 1 is a fragmentary perspective view of a prior ferro fluidic seal.
Figure 2:
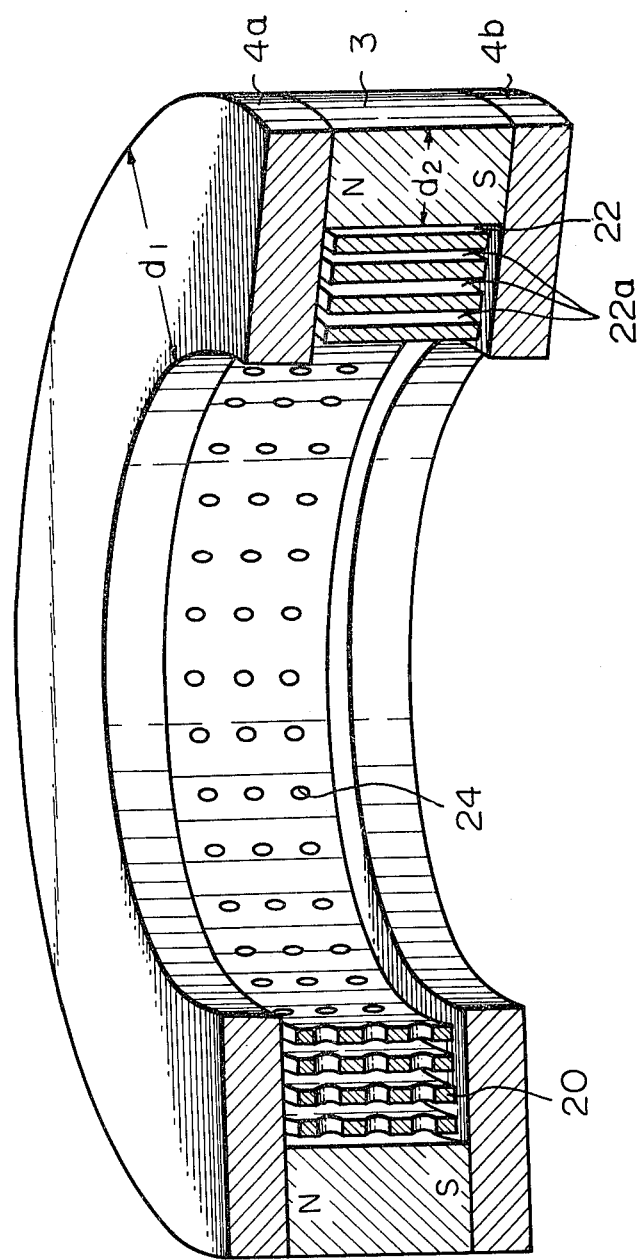
FIG. 2 is a fragmentary perspective view of the embodiment of the ferro fluidic seal according to the present invention.

FIG. 2 shows a fragmentary perspective view of the ferro fluidic seal assembly according to the present invention. In the figure, the reference numeral 3 is a cylindrical permanent magnet which is magnetized in the axial direction, 4a and 4b are ring-shaped yokes made of ferro magnetic material. The width $d_1$ of the yokes is longer than the thickness $d_2$ of the cylindrical wall of the permanent magnet, and the outer diameter of the yokes is almost the same as the outer diameter of the magnet. Therefore, when those yokes 4a and 4b and the magnet 3 are assembled so that the center axis of the former coincides with that of the latter, there is provided a ring-shaped hollow room enclosed by the inner surface of the magnet 3 and a pair of the yokes 4a and 4b. That magnet 3 is for instance coupled with the yokes 4a and 4b through adhesive means. It should be appreciated that the outer portion of the yokes and the magnet is fixed to a housing (not shown) through adhesive means or an O-ring seal, and a ferro magnetic spindle (not shown) passes through the rings of the yokes, as described in accordance with FIG. 1. And, ferro fluid is provided in the gaps between the spindle and the inner edges of the yokes.

In FIG. 2, a fresh fluid storage is mounted in that ring-shaped room which is enclosed by the inner surface of the magnet 3, the yokes 4a and 4b, and a spindle (not shown). That fresh fluid storage has a coil of a resilient elongated tape or belt 20. The width of the belt is almost the same as the height of the magnet 3 or the duration between the internal faces of the yokes 4a and 4b. Preferably, that width of the belt is a little shorter than the height of the magnet for the easy insertion of the belt in the room. The belt 20 is just wound in a coil shape, and the coil is mounted in that ring-shaped room, then, the coil expands outwardly using the spring action of the resilient nature of the belt. Therefore, the coil is resiliently adapted to the inner wall of the permanent magnet 3 as shown in FIG. 2, thus, the coil or the fresh fluid storage is fixed along the surface of the magnet by the spring action of the resilient belt. Preferably, the inner diameter of the coil is larger than the inner diameter of the ring 4a or 4b so that the coil does not contact with a spindle (not shown). The number of turns or the lamination of the coil in the embodiment of FIG. 2 is 4.

The material of the coil 20 is, for instance, stainless steel of non-magnetic nature, phosphor bronze, beryllium-copper, or resilient plastics. In case of stainless steel material, the SUS 303 or 304 material (AISI: American Iron and Steel Institute) of 0.1–0.2 mm of thickness is preferable. Preferably, that belt has a plurality of small through-holes 24 (for instance the diameter of each hole is about 0.5 mm) so that each hole can include fluid.

In the above structure, it should be appreciated that there are provided a thin cell 22 between the inner surface of the magnet 3 and the coil, and other thin spaces or cells 22a between each layer of the coil. Further, a hole 24 provides a small space or cell. Therefore, ferro fluid may be kept in those spaces or cells by the surface tension effect of the fluid.

In the above structure, ferro fluid stored in the coiled belt 20 is supplied to the clearance gaps between the yokes 4a and 4b, and a spindle (not shown), as the fluid in those gaps are exhausted. Therefore, the clearance gaps are always filled with ferro fluid, and an excellent ferro fluidic seal is obtained.

Figure 3A:
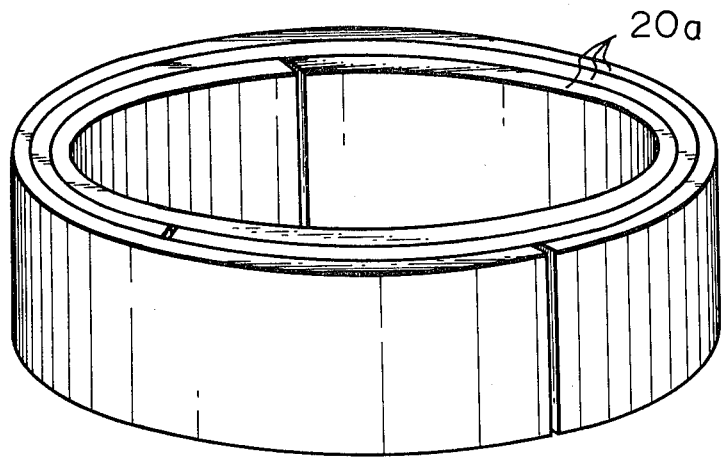
FIGS. 3A and 3B show two examples of the adopted structures of the belt of the fresh fluid storage.
Figure 3B:
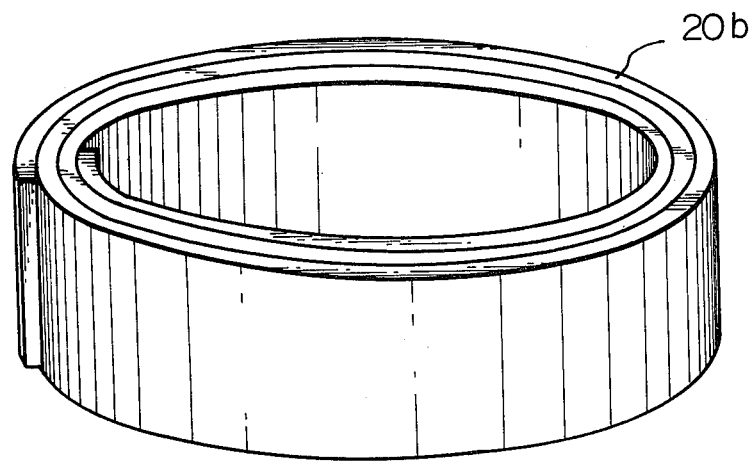

FIGS. 3A and 3B show two examples of the structure of the coil 20. In the embodiment of FIG. 3A, a belt is shaped in a plurality of rings which are coaxially arranged as shown in FIG. 3A. In the embodiment of FIG. 3B, a belt is wound in a coil structure 20b.

Figure 4A:
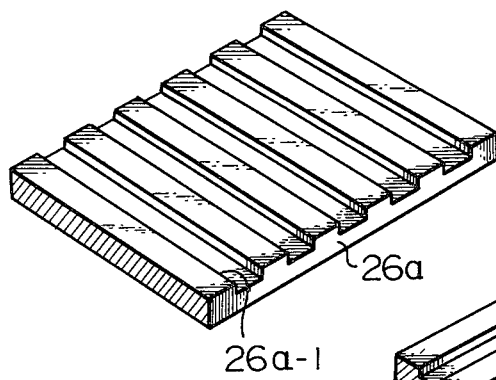
FIGS. 4A through 4G show some examples of a belt for the use of fresh fluid storage according to the present invention.
Figure 4B:
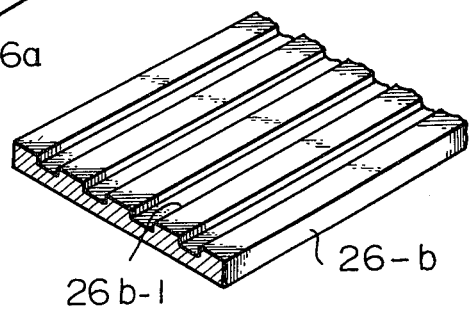
Figure 4C:
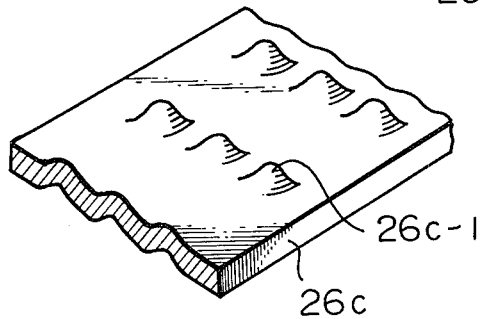
Figure 4D:
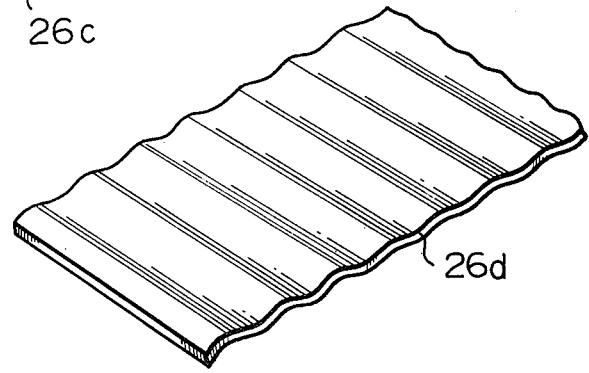
Figure 4E:
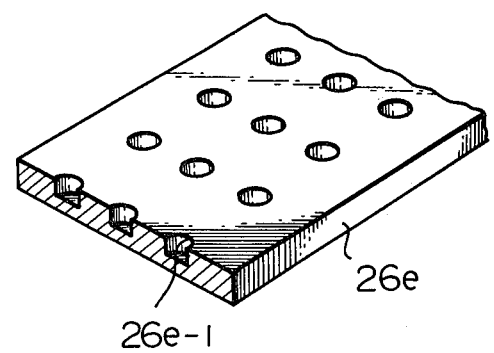
Figure 4F:
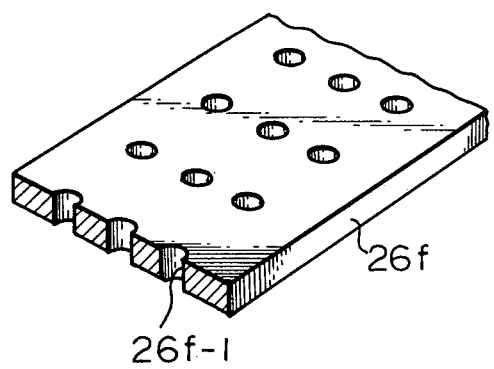
Figure 4G:
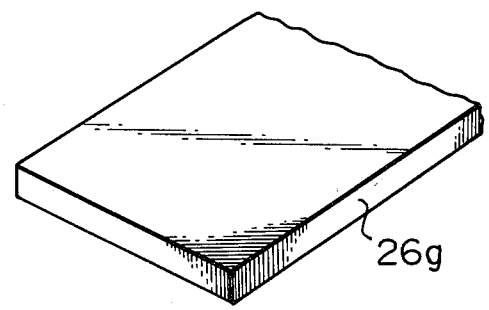

FIGS. 4A through 4G show some examples of the structure of a resilient belt. FIG. 4A shows a belt 26a which has a plurality of elongated parallel slits 26a-1 in the lateral direction of the belt. Those slits may include fluid, and thus, the belt may contain much fluid in that structure. FIG. 4B shows the belt 26-b which has a plurality of elongated resilient slits 26b-1 in the longitudinal direction of the belt. FIG. 4C shows the belt 26c which has a plurality of projections 26c-1 on the surface of the belt. The fluid may fill spaces among those projections. FIG. 4D shows the waveshaped belt 26d which is formed with alternate furrows and ridges extending side-by-side in the lateral direction of the belt. The fluid may be included among those furrows. FIG. 4E shows the belt 26e which has a plurality of half-holes 26e-1. Each half-hole 26e-1 does not pass through the belt, and fluid may be contained in those half-holes. FIG. 4F shows the belt 26f which has a plurality of through-holes 26f-1. Fluid may be contained in those through-holes. The embodiment of FIG. 2 uses the belt of FIG. 4F. FIG. 4G shows a flat belt 26g, in which although the belt is flat, fluid may be contained between the layers of the coil.

A belt is produced through conventional press process, or conventional photolitho-etching process.

Some modifications are possible to those skilled in the art from FIGS. 2 through 4G. For instance, a polygonal cylindrical permanent magnet is possible instead of a circular cylindrical magnet. Further, a magnet may be separated to a plurality of magnets in the circumferential direction. Further, the permanent magnet 3 may be replaced by the combination of a cylindrical permanent magnet which is shorter than the width of a belt, and a cylindrical ferro-magnetic ring positioned coaxially with the magnet so that the total height of the two cylindrical bodies is the same as the original replaced magnet.

Figure 5:
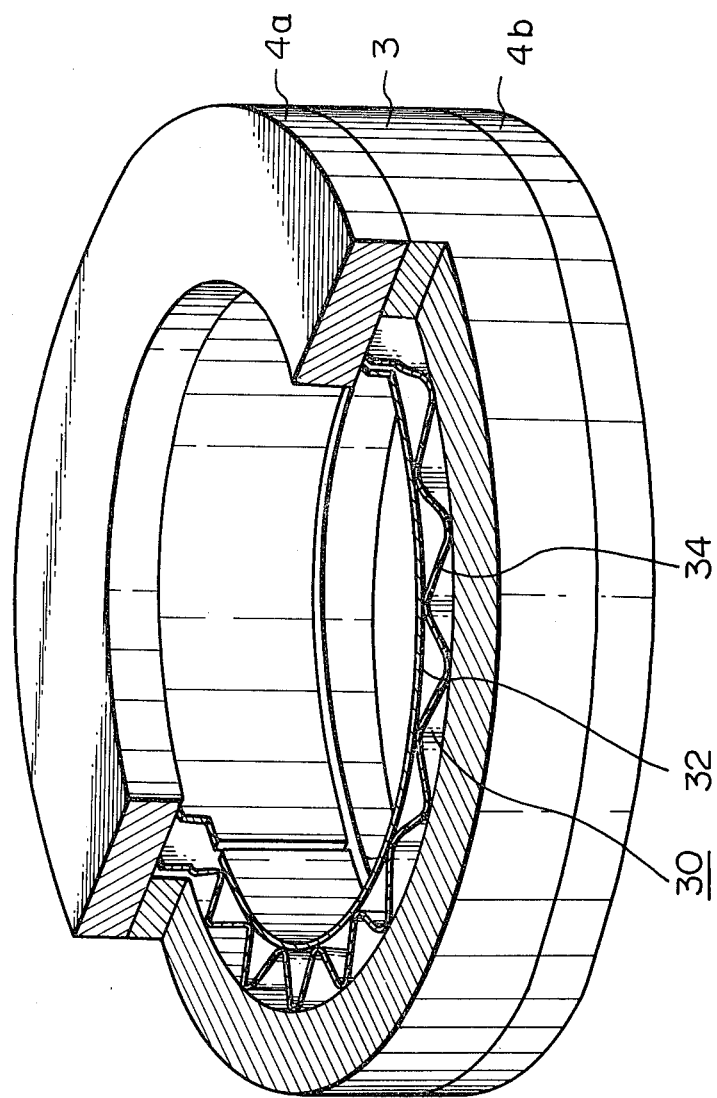
FIG. 5 is a fragmentary perspective view of another embodiment of the ferro fluidic seal according to the present invention.

FIG. 5 shows another embodiment of the ferro fluidic seal according to the present invention, and that embodiment has the feature of the particular fresh fluid storage. In FIG. 5, the cylindrical permanent magnet 3, and a pair of ring-shaped yokes 4a and 4b are similar to those of the previous embodiment of FIG. 2, and the ring-shaped empty room for accepting fresh fluid storage is provided so that said room is enclosed by the inner surface of the magnet 3, a pair of the yokes 4a and 4b, and a spindle (not shown). The fresh fluid storage 30 in the embodiment of FIG. 5 has the combination of the first resilient flat belt 32, and the second waveshaped belt 34, which shaped to provide a series of parallel furrows separated by ridges. Those belts 32 and 34 compose one-turn coils, respectively, and the width of the flat belt 32 is the same as the width of the waveshaped belt 34. Since the belt 32 is resilient, the belt 32 tends to extend outwardly, and therefore, the belt 32 pushes the waveshaped belt 34 outwardly, and those belts are adapted and fixed in the storage room by spring action. The flat belt 32 is shown in FIG. 4G, and the waveshaped belt 34 is shown in FIG. 4D.

In the above structure, ferro fluid is contained in the furrows of the waveshaped belt 34, and the fluid stored in the furrows is closed by the flat belt 32. The fluid is kept in those furrows with the surface tension effect of the fluid itself. The fluid kept in the storage is in fluid communication with the clearance gaps between a spindle (not shown) and the yokes 4a and 4b, as is the case of FIG. 2.

The embodiment of FIG. 5 is advantageous to keep more fluid in furrows as compared with that of FIG. 2.

Figure 6:
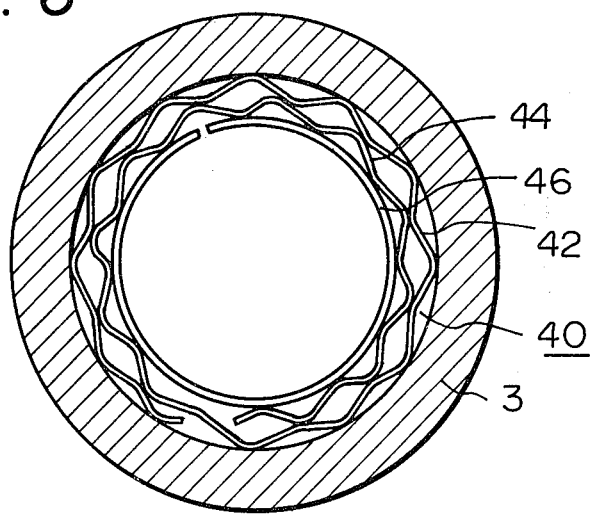
FIGS. 6 and 7 show two modifications of the ferro fluidic seal of FIG. 5.
Figure 7:
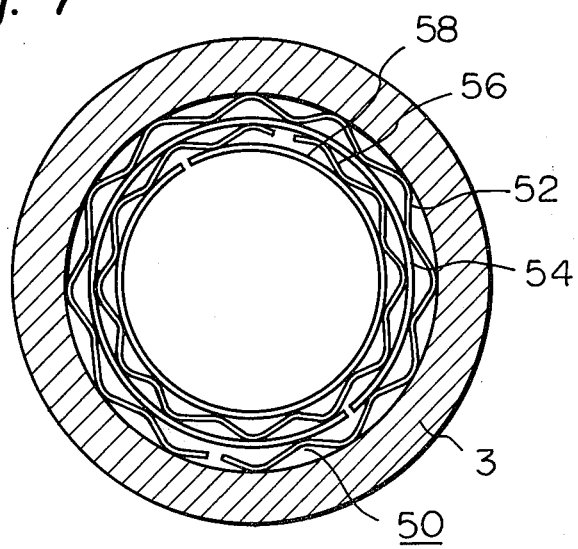

FIGS. 6 and 7 show two modifications of the structure of the fresh fluid storage of FIG. 5. The storage 40 of FIG. 6 comprises the first waveshaped belt 42, the second waveshaped belt 44, and the third flat belt 46. Those waveshaped belts 42 and 44 are provided by the two turns coil of the waveshaped belt in the embodiments. The storage 50 of FIG. 7 comprises the first waveshaped belt 52, the second flat belt 54, the third waveshaped belt 56, and the fourth flat belt 58. In the embodiments of FIGS. 6 and 7, the number of cells in the storage is increased as compared with that of FIG. 5, and therefore, more fluid may be contained stably, in particular, the embodiments of FIGS. 6 and 7 are effective when the diameter of a spindle is large, when the surface tension effect would not be enough to keep much fluid in the embodiment of FIG. 5.

In the embodiments of FIGS. 5 through 7, it should be appreciated that the belt 34, 42, 52, or 56 is not restricted to a waveshaped belt, but that belt may be replaced by a belt made of non-resilient material, or small resilient material with the shape of anyone of FIGS. 4A through 4G, further that belt may be composed of material which is deformable and has the nature to keep liquid.

Figure 8:
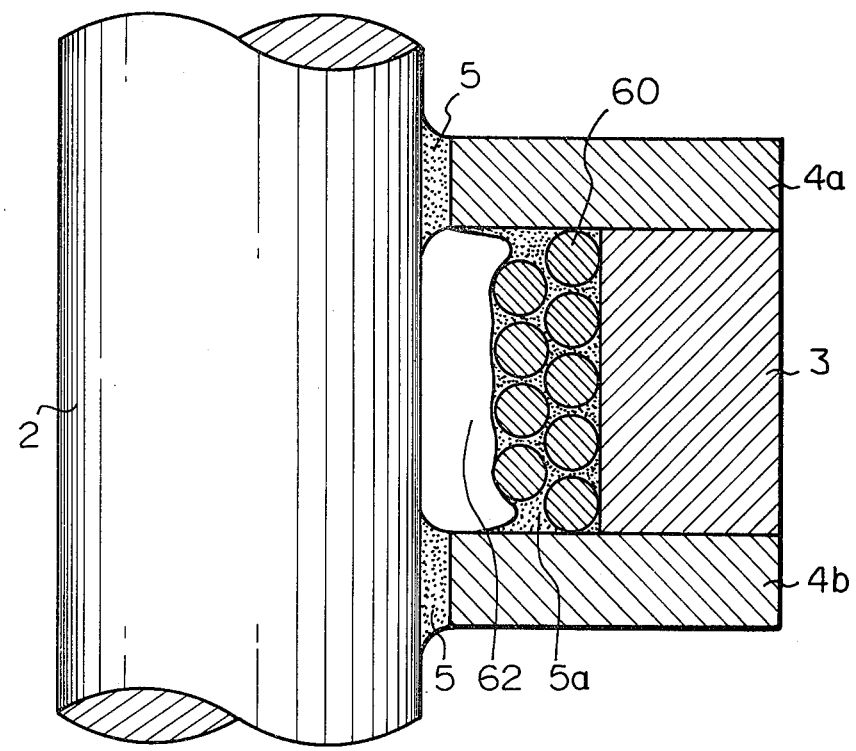
FIG. 8 shows the cross section of another embodiment of the ferro fluidic seal according to the present invention.
Figure 9:
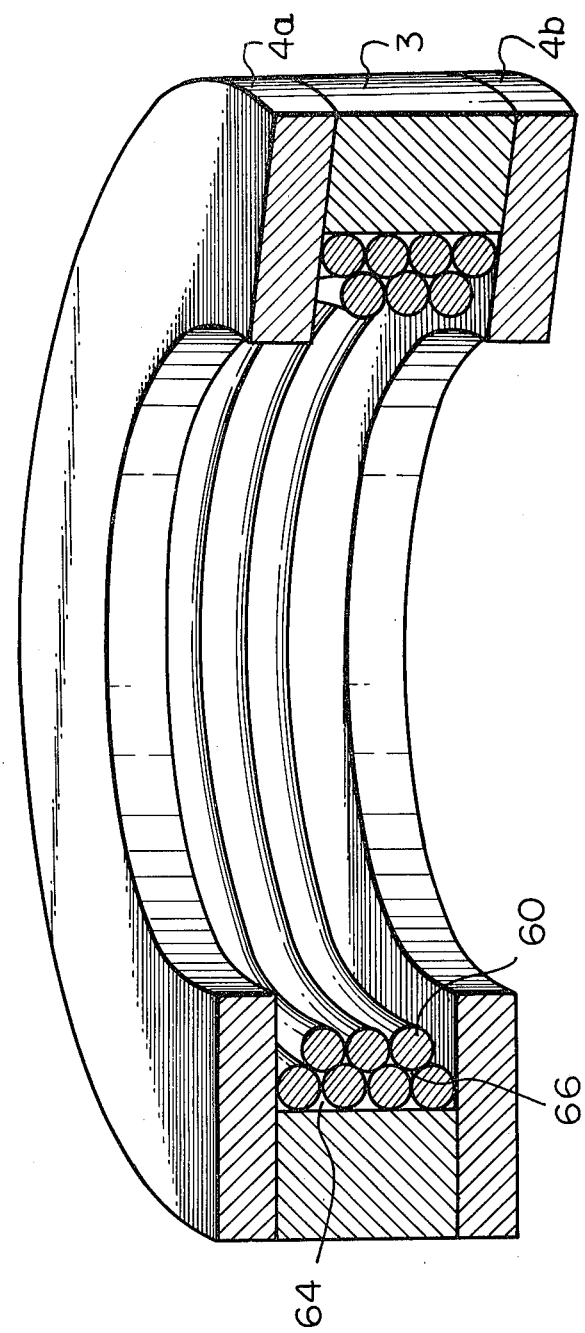
FIG. 9 is the fragmentary perspective view of the seal of FIG. 8.

FIGS. 8 and 9 show still another embodiment of the ferro fluidic seal according to the present invention, and that embodiment has the feature of the particular structure of the fresh fluid storage. In this embodiment, the cylindrical permanent magnet 3, and a pair of ring-shaped yokes 4a and 4b are similar to those of the previous embodiments of FIG. 2 and FIG. 5, and the ring-shaped empty room for accepting fresh fluid storage is provided so that said empty room is enclosed by the inner surface of the magnet 3, a pair of the yokes 4a and 4b, and a spindle 2. The fresh fluid storage 60 in FIGS. 8 and 9 is composed of a resilient wire which is wound in the shape of a coil. Since a wire is resilient, a coil tends to expand outwardly, and therefore, the coil is adapted and fixed in that storage room by the spring action of a wire itself. The space 62 in FIG. 8 is empty.

In the above structure, it should be appreciated that many cells 64 and 66 et al are provided between each adjacent wire in the coil, and/or between a wire and the magnet 3, and/or the yokes 4a and 4b. The fluid is kept in those cells by the surface tension effect of the fluid itself. Then, the fluid goes to the clearance gaps between the yokes 4a and 4b, and the spindle 2, as the fluid in those gaps is exhausted.

The present invention does not restrict the number of turns of a coil, so long as the coil contains enough fluid. Preferably, that coil has a lap winding.

FIGS. 10 through 15 show the modifications of the previous embodiments shown in FIGS. 2 through 9, and the embodiments in those figures 10 through 15 are intended to seal the structure in which a center spindle 2a is fixed and an external body 100 rotates around the fixed spindle, while in the previous embodiments in FIGS. 2 through 9 a spindle rotates.

Figure 10:
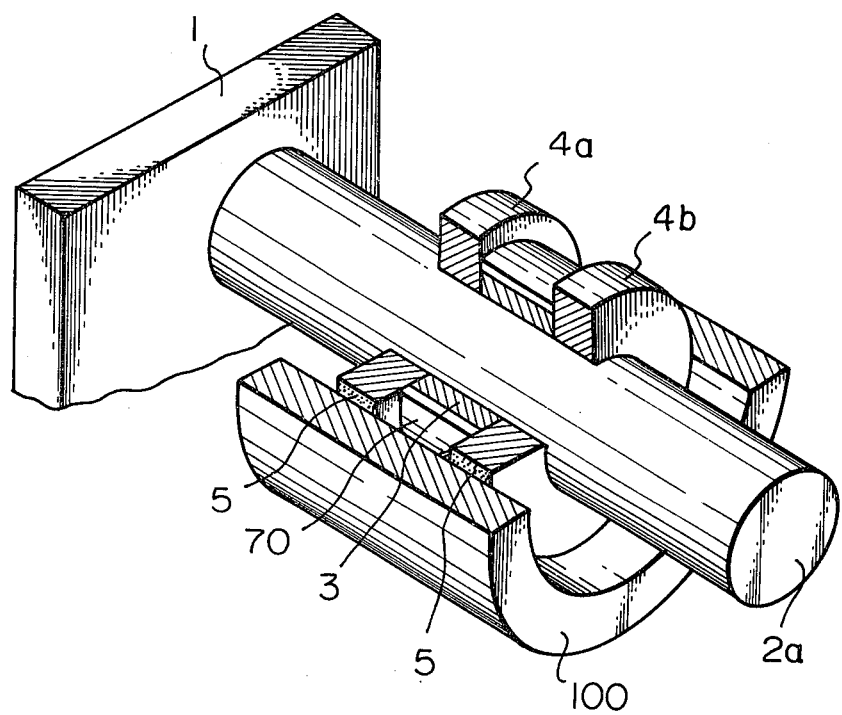
FIG. 10 is the fragmentary perspective view of still another embodiment of the ferro fluidic seal according to the present invention.

In FIG. 10, the reference numeral 1 is the housing, 2a is the fixed spindle which is fixed to the housing 1 and is made of a non-magnetic material. The reference numeral 3 is a cylindrical permanent magnet, 4a and 4b are ferro magnetic yokes in disc shape. The permanent magnet 3 and the yokes 4a and 4b are fixed to the spindle 2a as shown in FIG. 10. The thickness of the magnet 3 is smaller than the width of the yokes 4a and 4b, and the magnet 3 is fixed to the spindle 2a so that the inner surface of the magnet 3 is on the cylindrical same circular plane as the inner surface of the yokes 4a and 4b. Therefore, a ring shaped room which is enclosed by the outer surface of the magnet 3, and a pair of the yokes 4a and 4b is provided outside of the permanent magnet 3. A fresh fluid storage 70 is mounted in that ring shaped empty room. A cylindrical rotational external body 100 which is made of ferro magnetic material is arranged as shown in FIG. 10 so that said body 100 rotates around the fixed spindle 2a and the seal (3, 4a, 4b). A narrow ring-shaped clearance gap is left between the yokes 4a and 4b, and the inner surface of the rotational body 100, so that the fluid 5 in the gap provides the ferro fluidic seal.

In the above configuration, the magnetic flux passes from the N pole of the magnet 3, through the first yoke 4a, the external rotational body 100, the second yoke 4b, to the S pole of the magnet 3, and the ferro fluid 5 included in the gap between the yokes 4a and 4b, and the external rotational body 100 provides the ferro fluidic seal. When the fluid 5 in the gap is exhausted, fresh fluid is supplied to the gap from the fresh fluid storage 70.

Figure 11:
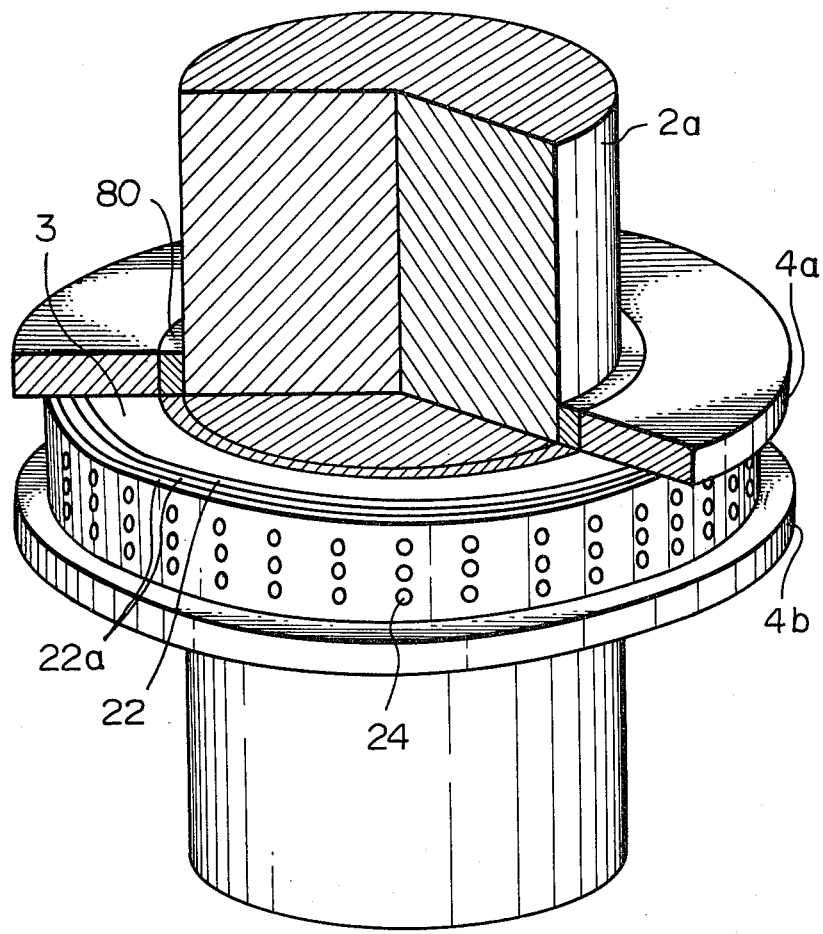
FIG. 11 is the fragmentary perspective view of the embodiment of the ferro fluidic seal for the use of the structure of FIG. 10.

FIG. 11 shows the fresh fluid storage for the seal of FIG. 10. The fresh fluid storage in FIG. 11 is composed of a resilient belt of FIG. 4F, as in the embodiment of FIG. 2. The permanent magnet 3, and the yokes 4a and 4b are fixed to the spindle 2a by using the back plate 80, or an O-ring, or those members are adhered to the spindle 2a. The resilient belt is pre-shaped in a coil shape, then, the coiled belt encloses the magnet 3, and the belt is adapted and fixed around the magnet 3 with its own spring action. The belt may have a plurality of small through holes 24 which improve the storage capacity of the fluid. As the belt is arranged in a coil shape, thin slits 22 and 22a are provided between the sheets of the coil, and fluid is kept in those slits 22 and 22a, and/or in the holes 24.

The structure of the belt may either be in coaxial rings as shown in FIG. 3A, or in coil shape as shown in FIG. 3B. Further, the belt of FIG. 11 may be any type shown in FIGS. 4A through 4G. The material of the belt of FIG. 11 may be the same as that of FIG. 2.

Figure 12:
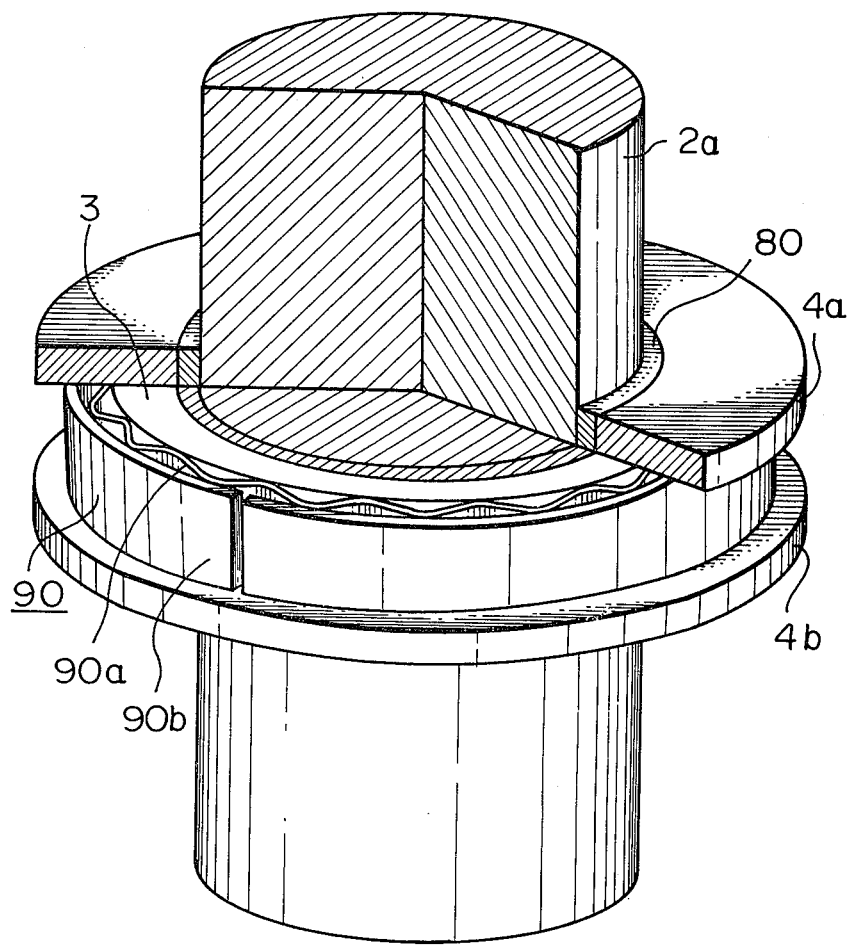
FIG. 12 is the fragmentary perspective view of another embodiment of the ferro fluidic seal for the use of the structure of FIG. 10, FIGS. 13 and 14 are two modifications of the seal of FIG. 12.

FIG. 12 shows another embodiment of the fresh fluid storage 90 for the seal of FIG. 10. The storage 90 of FIG. 12 is composed of a waveshaped first belt 90a, and a resilient flat second belt 90b. Thus, the structure of the storage 90 of FIG. 12 is similar to that of FIG. 5. In the embodiment of FIG. 12, fluid is contained in the furrows in the waveshaped belt, and the fluid is kept in the furrows by the flat belt 90b. The operation of the fresh fluid storage 90 of FIG. 12 is similar to that of FIG. 5.

Figure 13:
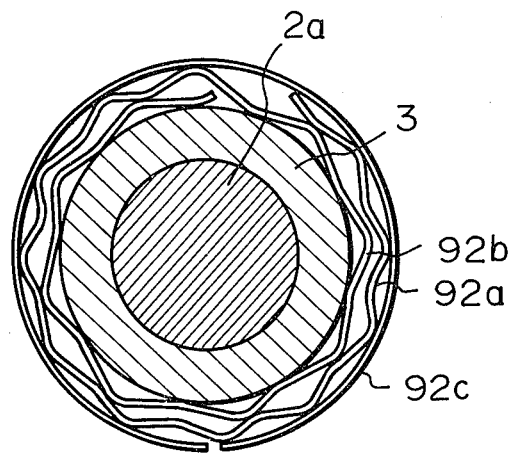
Figure 14:
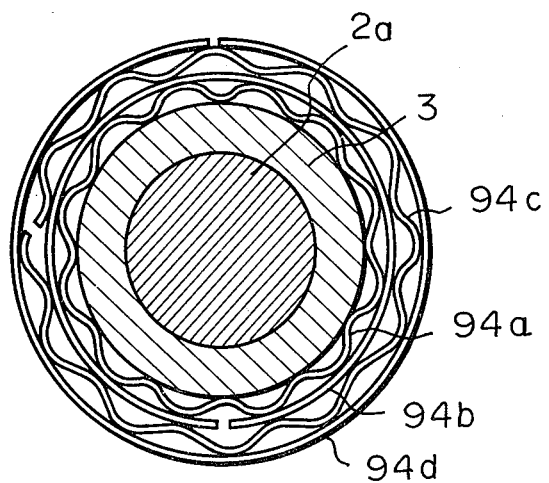

FIGS. 13 and 14 are the modifications of the storage of FIG. 12. The storage of FIG. 13 is composed of the first waveshaped belt 92a, the second waveshaped belt 92b, and the third flat resilient belt 92c, and the fluid is contained in the furrows provided by those belts, and the fluid is communicated to the clearance gap between the yokes and the rotational body as the fluid in that gap is exhausted.

In the embodiment of FIG. 14, the fresh fluid storage is composed of the first waveshaped belt 94a, the second resilient flat belt 94b, the third waveshaped belt 94c, and the fourth resilient flat belt 94d.

In the embodiments of FIGS. 12 through 14, it should be appreciated that the belt 90a, 92a, 92b, 94b or 94c is not restricted to a waveshaped belt, but that belt may be replaced by a belt made of non-resilient material, or small resilient material with the shape of anyone of FIGS. 4A through 4G, further, that belt may be composed of material which is deformable and has nature to keep liquid like felt.

It is clear that the embodiments of FIGS. 13 and 14 correspond to the embodiments of FIGS. 6 and 7, respectively.

Figure 15:
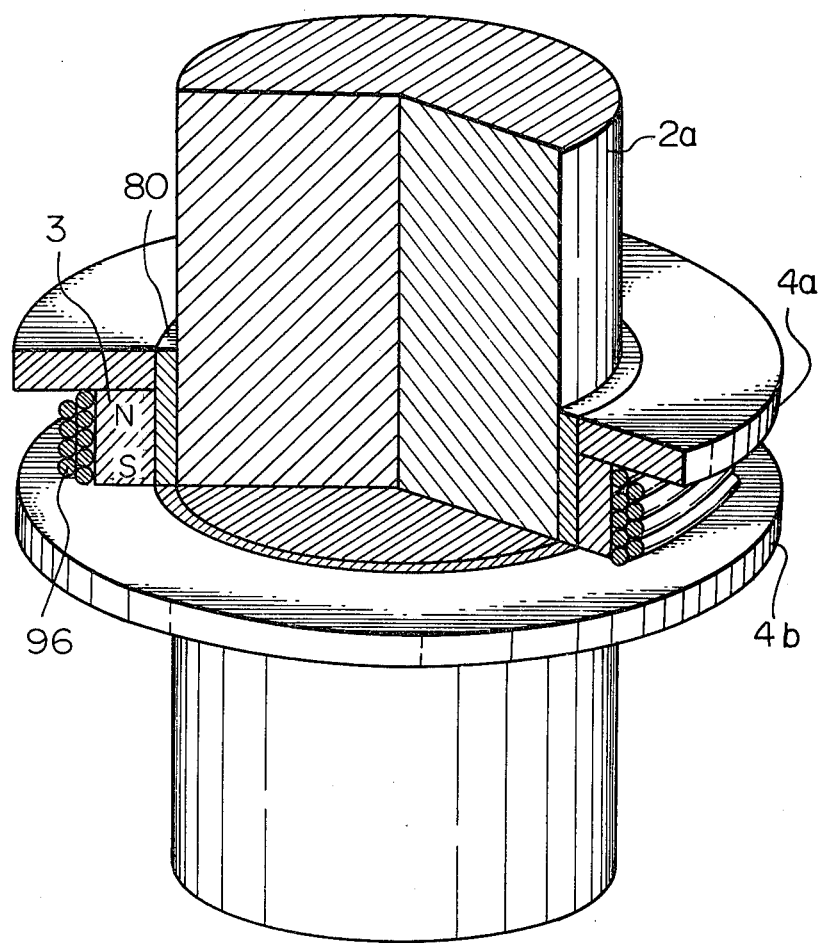
FIG. 15 is the fragmentary perspective view of still another embodiment of the ferro fluidic seal for the use of the structure of FIG. 10.

FIG. 15 shows still another embodiment of the fresh fluid storage according to the present invention, and the feature of the storage of FIG. 15 is that the storage is composed of wire 96 which is wound around the permanent magnet 3. The operation of the storage of FIG. 15 is similar to that of FIGS. 8 and 9.

In all the above embodiments, a resilient belt, or a wire is implemented by stainless steel of non-magnetic nature, phosphor bronze, beryllium-copper, or resilient plastics. And, a non-resilient, or small resilient belt is implemented by plastics, or other material which has nature to keep liquid.

As described above, according to the present invention, the fresh fluid storage is simple in structure, and is easy to assemble in a seal. Further, the present storage has no disadvantage of a prior felt storage which separates a fiber. Therefore, the present seal provides an excellent ferro fluidic seal.

From the foregoing it will now be apparent that a new and improved ferro fluidic seal has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A ferro fluidic seal comprising:
   a seal assembly comprising a substantially cylindrical permanent magnet magnetized in the axial direction of the same, a pair of ring shaped yokes made of ferro-magnetic material coupled coaxially with said permanent magnet, and a fresh fluid storage containing fluid with ferro magnetic property mounted in a room defined by said magnet and the yokes,
   a rotational body rotational relative to said seal assembly, said rotational body being arranged coaxially with said seal assembly so that thin clearance gaps are provided between the rotational body and the yokes, and said rotational body being made of ferro-magnetic material,
   fluid contained in said fresh fluid storage being communicated with said clearance gaps between the yokes and the rotational body to seal said gaps,
   said fresh fluid storage comprising a resilient elongated member adapted in a circular shape along the surface of said cylindrical permanent magnet, and said member being fixed on the surface of the permanent magnet with a spring action by said member itself.

2. A ferro fluidic seal according to claim 1, wherein said rotational body is a spindle rotationally arranged in said seal assembly, said seal assembly is fixed to a housing, and said fresh fluid storage is defined by the outer surface of the spindle, the yokes and the inner surface of the permanent magnet.

3. A ferro fluidic seal according to claim 1, wherein said rotational body is a hollow cylindrical body rotationally arranged around said seal assembly, said seal assembly is fixed to a housing, and said fresh fluid storage is defined by the inner surface of the hollow cylindrical body, the yokes and the outer surface of the permanent magnet.

4. A ferro fluidic seal according to claim 1, wherein said fresh fluid storage has a plurality of coaxial belts laminated to each other.

5. A ferro fluidic seal according to claim 1, wherein said fresh fluid storage is a coil of a belt.

6. A ferro fluidic seal according to claim 1, wherein said resilient elongated member is a belt having a plurality of slits on the surface of the belt in a lateral direction of the belt.

7. A ferro fluidic seal according to claim 1, wherein said resilient elongated member is a belt having a plurality of slits on the surface of the belt in a longitudinal direction of the belt.

8. A ferro fluidic seal according to claim 1, wherein said resilient elongated member is a belt having a plurality of projections on the surface of the belt.

9. A ferro fluidic seal according to claim 1, wherein said resilient elongated member is a waveshaped belt with a series of parallel furrows separated by ridges.

10. A ferro fluidic seal according to claim 1, wherein said resilient elongated member is a belt having a plurality of through-holes.

11. A ferro fluidic seal according to claim 1, wherein said resilient elongated member is a belt having a plurality of half-holes.

12. A ferro fluidic seal according to claim 1, wherein said resilient elongated member is a flat belt.

13. A ferro fluidic seal according to claim 1, wherein said resilient elongated member is a wire wound along the permanent magnet.

14. A ferro fluidic seal according to claim 1, wherein said fresh storage is further composed of second ring sandwiched between said elongated member and the permanent magnet, and said second ring has the nature to keep liquid.

15. A ferro fluidic seal according to claim 14, wherein more than two second rings are provided.

16. A ferro fluidic seal according to claim 14, wherein more than two resilient elongated members and more than two second rings are provided.

17. A ferro fluidic seal according to claim 1, wherein said resilient elongated member is made of stainless steel.

18. A ferro fluidic seal according to claim 1, wherein said resilient elongated member is made of phosphor bronze.

19. A ferro fluidic seal according to claim 1, wherein said resilient elongated member is made of beryllium-copper.

20. A ferro fluidic seal according to claim 1, wherein said resilient elongated member is resilient plastics.

* * * * *